United States Patent
Ong et al.

(10) Patent No.: US 10,776,308 B2
(45) Date of Patent: Sep. 15, 2020

(54) SMART MEMORY DATA STORE OR LOAD METHOD AND APPARATUS

(71) Applicant: Intel Corporation, Santa Clara, CA (US)

(72) Inventors: Soo Keong Ong, Penang (MY); Jayson Strayer, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 32 days.

(21) Appl. No.: 15/639,548

(22) Filed: Jun. 30, 2017

(65) Prior Publication Data

US 2019/0004800 A1   Jan. 3, 2019

(51) Int. Cl.
| G06F 15/78 | (2006.01) |
| G06F 9/30  | (2018.01) |
| G06F 9/50  | (2006.01) |
| G06F 3/06  | (2006.01) |
| G06F 9/38  | (2018.01) |

(52) U.S. Cl.
CPC .......... *G06F 15/7821* (2013.01); *G06F 3/061* (2013.01); *G06F 3/0626* (2013.01); *G06F 3/0638* (2013.01); *G06F 9/30043* (2013.01); *G06F 9/3877* (2013.01); *G06F 9/5016* (2013.01); *G06F 9/5055* (2013.01)

(58) Field of Classification Search
None
See application file for complete search history.

(56) References Cited

U.S. PATENT DOCUMENTS

| 8,255,663 | B2 * | 8/2012 | Cho ................... G06F 12/0246 711/103 |
| 2003/0005259 | A1 * | 1/2003 | Nalawadi .............. G06F 9/4411 712/1 |
| 2008/0229035 | A1 * | 9/2008 | Thayer ................ G06F 12/0607 711/157 |
| 2014/0337589 | A1 * | 11/2014 | Carpenter ............ G06F 3/0604 711/157 |
| 2015/0178204 | A1 * | 6/2015 | Ray .......................... G11C 5/04 711/103 |

\* cited by examiner

*Primary Examiner* — Charles J Choi
(74) *Attorney, Agent, or Firm* — Schwabe, Williamson & Wyatt, P.C.

(57) ABSTRACT

Apparatuses, methods and storage medium associated with smart memory data store/load technology, are disclosed herein. In embodiments, an apparatus may include a processor; a plurality of memory units; a memory controller coupled with the processor and the plurality of memory units to control access of the plurality of memory units, that includes hardware physical memory interleaving support; and one or more hardware data processing logic blocks coupled to the plurality of memory units to provide near data processing of data received by the plurality of memory units. The apparatus may further include a driver to support applications operated by the processor to perform location-aware memory-mapped device accesses to selectively store or load data into selected ones or aggregation of selected ones of the plurality of memory units contiguously. Other embodiments may be described and/or claimed.

23 Claims, 6 Drawing Sheets

US 10,776,308 B2

SMART MEMORY DATA STORE OR LOAD METHOD AND APPARATUS

TECHNICAL FIELD

The disclosure relates to the fields of computing and memory. More particularly, the disclosure relates to data store or load method and apparatus for smart memory arrangements.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

An emerging generation of advanced computing system may include smart memory. Smart memory is the term currently used to refer to memory subsystem with near data processing (NDP) or in memory processing (IMP) capability, in addition to the memory/storage modules themselves. The memory is smart in that the complementary NDP or IMP capability can process the data after the memory subsystem receives the data.

Typically, for performance reasons, memory controller that supports smart memory also include hardware implemented physical memory interleaving. Physical memory interleaving may provide performance improvement in the range of 20%-30% if software is designed well to read/write data on cacheline boundary. However, physical memory interleaving may have the potential disadvantage of fragmenting the data being stored. As a result, processing of the fragmented data may need another layer of merging operation (that merges results from two or more interleaved memory/storage modules), which can reduce the increment of performance that is supposed to be achieved. It is also very difficult, or impossible, to perform merging operation for some cases where complete dataset have to be processed together or in order. And the entire performance increment would be lost if physical memory interleaving is disabled to prevent data fragmentation.

BRIEF DESCRIPTION OF THE DRAWINGS

Embodiments of the smart memory data store/load technology of the disclosure will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
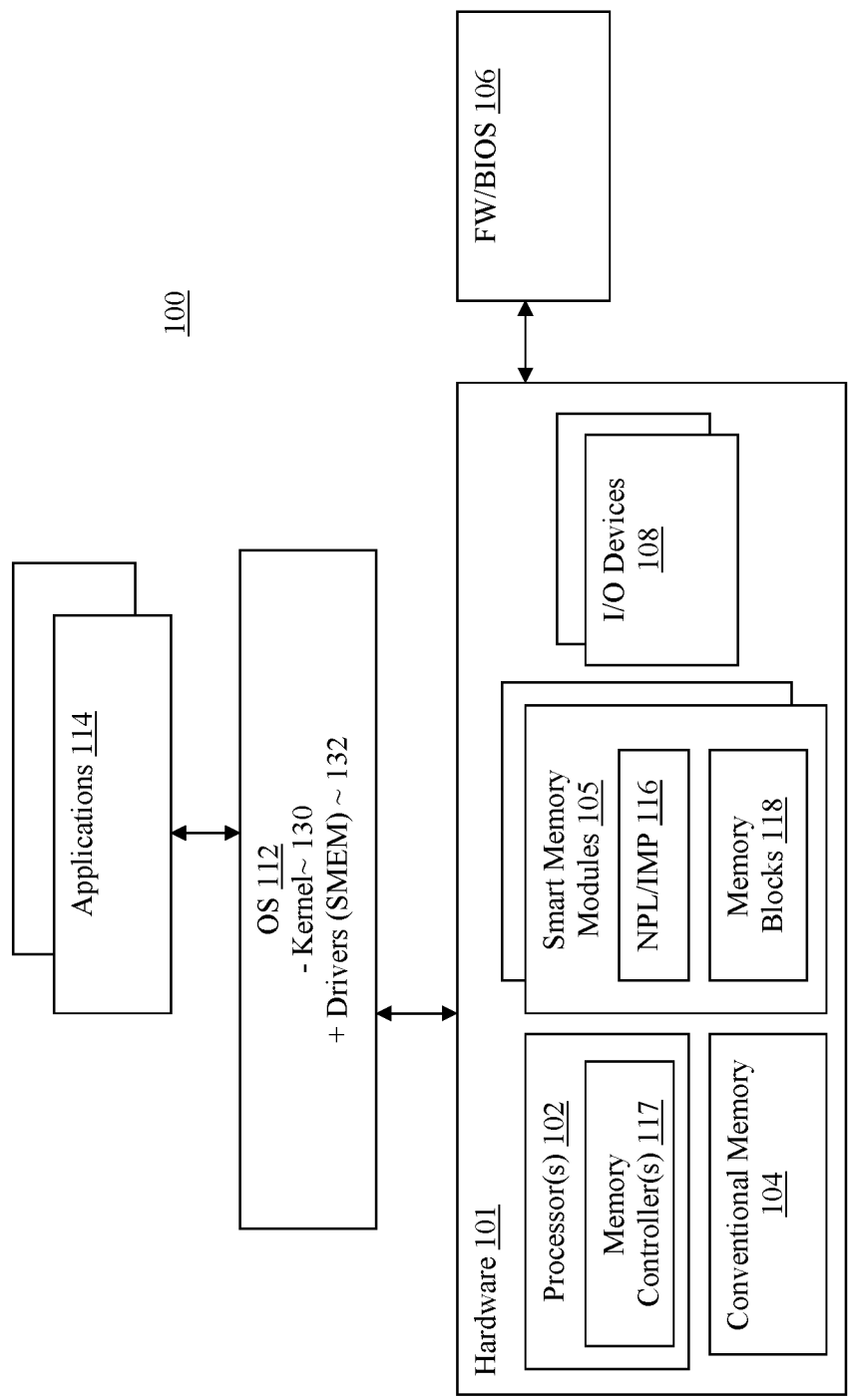
FIG. 1 illustrates a computing device having the smart memory data store/load technology of the disclosure, according to various embodiments.

Apparatuses, methods and storage medium associated with smart memory data store/load technology, are disclosed herein. In embodiments, an apparatus may include a processor; a plurality of memory units; a memory controller coupled with the processor and the plurality of memory units to control access of the plurality of memory units, that includes hardware physical memory interleaving support; and one or more hardware data processing logic blocks coupled to the plurality of memory units to provide near data processing of data received by the plurality of memory units. The apparatus may further include a driver operated by the one or more processors to support applications operated by the processor to perform location-aware memory-mapped device accesses to selectively store or load data into selected ones or aggregations of selected ones of the plurality of memory units contiguously, thereby reducing or eliminating fragmentation. These and are aspects will be further described below.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the disclosure. Therefore, the following detailed description is not to be taken in a limiting sense, and the scope of embodiments is defined by the appended claims and their equivalents.

Aspects of the disclosure are disclosed in the accompanying description. Alternate embodiments of the disclosure and their equivalents may be devised without parting from the spirit or scope of the disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the disclosure, the phrase "A and/or B" means (A), (B), or (A and B). For the purposes of the disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the disclosure, are synonymous.

As used herein, the term "module" may refer to, be part of, or include an Application Specific Integrated Circuit (ASIC), an electronic circuit, a programmable combinational logic circuit (such as a Field Programming Gate Array (FPGA)), a processor (shared, dedicated, or group) and/or memory (shared, dedicated, or group) that execute one or more software or firmware programs, and/or other suitable components that provide the described functionality.

Referring now to FIG. 1, wherein a computing device having the smart memory data store/load technology of the disclosure, according to various embodiments, is shown. As illustrated, in embodiments, computing device 100 may include hardware 101, firmware (FW)/basic input/output services (BIOS) 106, Operating System (OS) 112 and applications 114, operatively coupled with each other as shown. Hardware 101 may include one or more processors 102 (each having one or more processor cores, and one or more memory controllers 117), conventional memory 104, and a number of smart memories 105. In embodiments, each smart memory 105 may include a number of memory blocks 118, and NDP/IMP 116. In some embodiments, the number of smart memories 105 may be 1, 2, 3, 4, 5, 6, and so forth. In embodiments, memory controller(s) 117 may include hardware implemented physical memory interleaving. For ease of understanding, the description will be presented in the context of a processor 102 with a memory controller 117, but the description is not to be construed as limiting. It is contemplated that the disclosure may be practiced with one or more processors, each having one or more memory controllers.

Storage locations of conventional memory 104 and memory blocks 118 may be organized into a number of memory frames. Typically, the size of a memory page (and in turn) the size of memory frames may be processor and memory controller implementation dependent. In embodiments, conventional memory 104 may be organized into 4 KB memory pages. The size of an interleaved line of a frame may be the same or in multiple of the size of a memory page, and they are aligned on the boundary. For some embodiments, where the memory pages are 4 KB in size, and data are to be interleaved in 2 smart memories 105, the size of a frame line may be 4 KB, 8 KB and so forth. In other words, for embodiments where a frame line is 4 KB, address 0 to 4 KB-1 come from the first smart memory 105, address 4 KB to 8 KB-1 come from the second smart memory 105, address 8 KB to 12 KB-1 come from the first smart memory 105, and so on. In alternate embodiments, with additional support from processor 102, e.g., a page to interleaved line mapping table, size of an interleaved line may be less than the size of a memory page.

Figure 2:
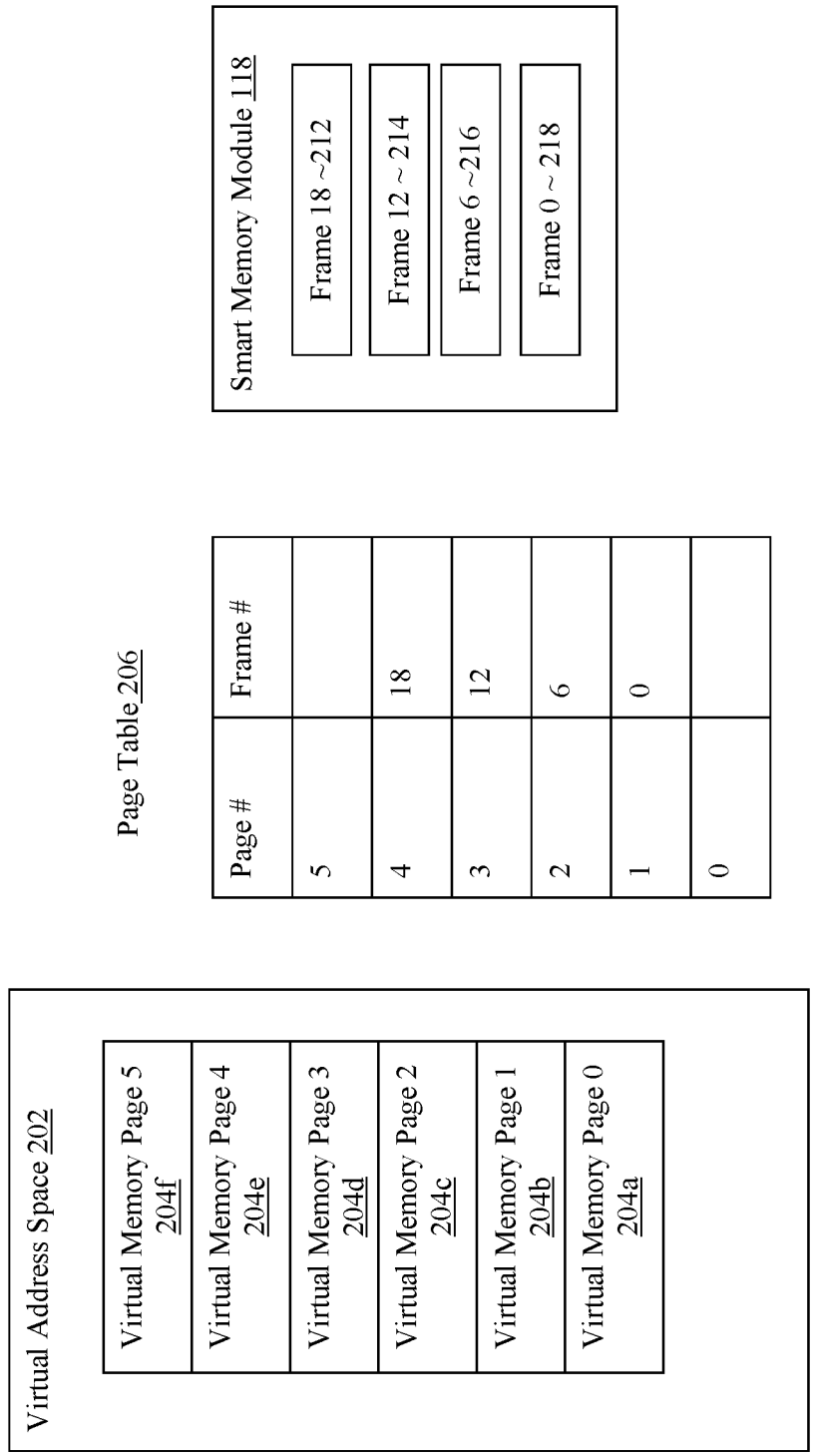
FIG. 2 illustrates a page table to map memory pages of a virtual address space to interleaved memory frames of a smart memory, according to various embodiments.

OS 112 may include kernel 130 which may be configured to perform core operating system functions/services, e.g., task scheduling, memory management/allocation, and so forth. Referring also to FIG. 2, applications 114 may be executed in their respective virtual address spaces 202, each having a number of virtual memory pages, e.g., virtual memory pages 204a-204f. Virtual memory pages 204a-204f may be selectively mapped to the physical memory frames of conventional memory 104 or physical memory frames of smart memories 105. In embodiments, both mappings may be performed using paging tables associated with the respective memories 104 and 105, e.g., example page table 206, which may be configured to map virtual memory pages 204a-204f of an application 114 to various interleaved memory frames 212-218 of smart memories 105 (when the application 114 is active). In embodiments, the page tables may be set up in an area of conventional memory 104 allocated to OS 112, and loaded into the allocated area by OS 112, when the execution context switches to the application 112. In embodiments, processor 102 may include a translation lookaside buffer (TLB) (not shown) to cache a portion of the page tables (including page table 206 of an active application). When a contiguous virtual address range is read/write, processor 102 may use the cached portion of read page table 206 in TLB and get the physical frame number of smart memory 105 that is interleaved in hardware configuration.

Referring back to FIG. 1, kernel 130 may include a number of drivers 132 to interact/interface with various devices of computing system 100. In embodiments, drivers 132 may be configured with a memory-mapped device access driver (SMEM) 132 to facilitate applications 114 in performing memory-mapped device accesses with conventional memory 104 or smart memory 105. In particular, SMEM 132 may be configured to populate page table 206 with the mappings of the virtual memory pages 204a-204f of a virtual address space 202 of an application 114 to memory frames of smart memories 105. Further, SMEM 132 may be incorporated with the smart memory data store/load technology of the disclosure. SMEM 132 may be configured to be able to respond to request of an application 114 specific to individual ones or aggregation of selected ones of smart memories 105, and return to the application 114 a range of virtual addresses of a specific smart memory 105 or a specific aggregation of memory units 105 opened by the application 114.

Figure 3:
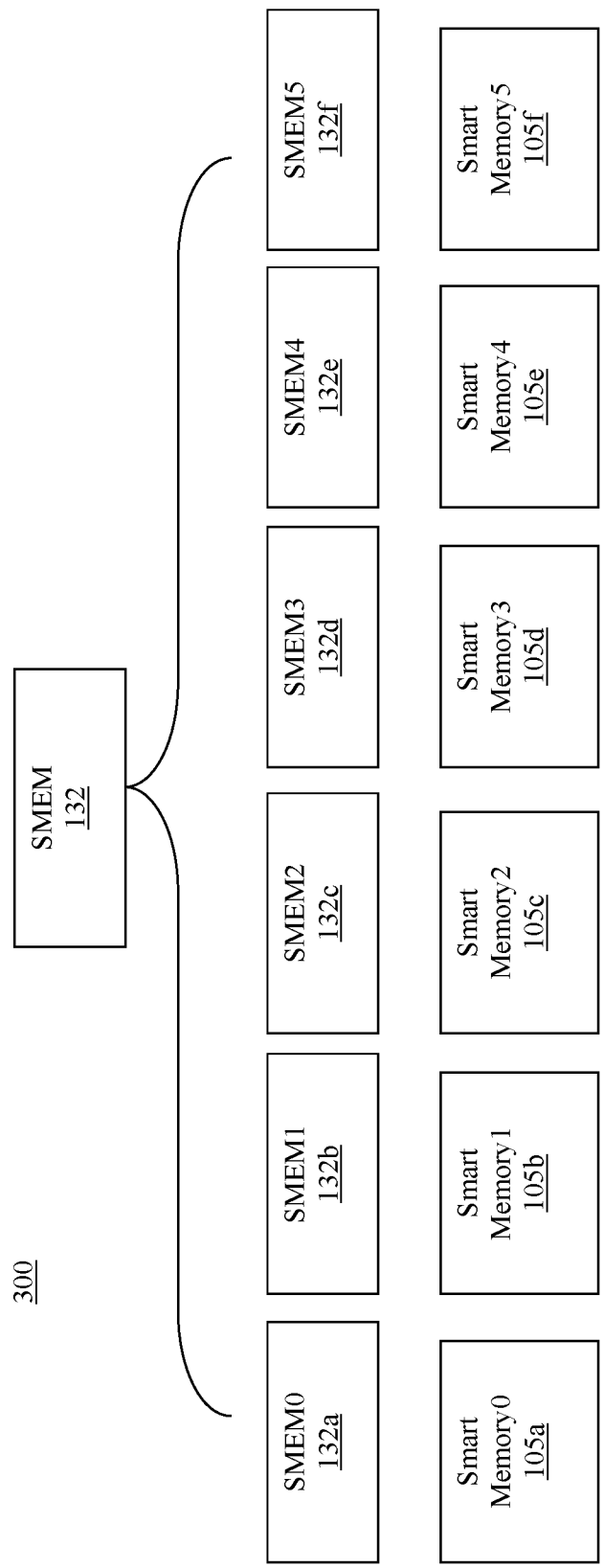
FIG. 3 illustrates a driver configured to support location-aware specific reference of memory-mapped device accesses, according to the various embodiments.

Referring also to FIG. 3, in example embodiments, hardware 101 may include six (6) smart memories 105a-105f, SMEM 132 may be configured to recognize invocation SMEM0-SMEM5 132a-132f as corresponding specific requests of an application 114 for virtual address ranges of corresponding smart memories 105a-105f. As a result, applications 114 may perform location-aware data store or load to selectively store or load data into selected ones of smart memories 105a-105f contiguously, to reduce or eliminate the data fragmentation issue caused by hardware implemented physical memory interleaving. In alternate embodiments, SMEM 132 may also be configured to recognize invocation of SMEM01, SMEM23, SMEM45 as corresponding to specific requests of an application 114 for virtual address ranges of three corresponding combined/ aggregated smart memory units 105a-105b, 105c-105d, and 105e-105f. As a result, applications 114 may perform location-aware data store or load to selectively store or load data into selected ones of three pairs of combined/aggregated smart memories 105a-105b, 105c-105d, and 105e-105f contiguously, to reduce or eliminate the data fragmentation issue caused by hardware implemented physical memory interleaving. In alternate embodiments, combined/aggregated smart memory units 105a-105f may be more than 2 units, and may be memory units that are not adjacent to each other.

In embodiments, SMEM 132 may gather the mapping information of smart memories 105 from configuration tables of computer system 100 having the information, e.g., the advanced configuration and power interface (ACPI) table maintained by FW/BIOS 106, and calculate the virtual address ranges of smart memories 105 from the obtained mapping information. In alternate embodiments, SMEM 132 may obtain the mapping information through discovery of the memory channels where smart memories 105 are connected. In embodiments, SMEM 132 may discover information, such as channels, sizes, and so forth, of smart memories 105 using serial presence detect or other known detection methodologies. On discovery, SMEM 132 may calculate the physical memory mapping information. Further, SMEM driver 132 may form the post-interleave physical address map for smart memories 105 by detecting hardware level registers to understand the interleave settings configured.

Referring back to FIG. 1, processor 102 may be any one of a number of processors known in the art, having one or more processor cores. In alternate embodiments, memory controller 117 may be disposed outside, separate from processor 102. Similarly, conventional memory 104 may be any known volatile or non-volatile memory in the art, suitable for storing data. Memory 104 may include a hierarchy of cache memory and system memory. Both the cache and system memory may be respectively organized into cache pages and memory pages. Likewise, smart memories 105 may be any number of conventional memory/storage modules, including but are not limited to dual in-line memory modules (DIMM), soldered down synchronous random access memory (SDRAM) modules on system board, shared memory, storage as memory, non-volatile DIMM, and so forth. NDP/IMP 116 may be implemented with ASIC, or any one of a number of programmable circuits, including but is not limited to FPGA. Further, in alternate embodiments, NDP/IMP 116 may be disposed outside smart memories 105, e.g., with processor 102, and may serve multiple ones of smart memories 105.

In embodiments, as shown, hardware 101 may further include input/output (I/O) devices 108, or other elements (not shown). Examples of I/O devices 108 may include communication or networking interfaces, such as Ethernet, WiFi, 3G/4G, Bluetooth®, Near Field Communication, Universal Serial Bus (USB) and so forth, storage devices, such as solid state, magnetic and/or optical drives, input devices, such as keyboard, mouse, touch sensitive screen, and so forth, and output devices, such as, display devices, printers, and so forth.

FW/BIOS 106 may be any one of a number FW/BIOS known in the art. OS 112, except for the teachings of the disclosure, may likewise be any one of a number of OS known in the art, e.g., the Windows OS from Microsoft® Corporation, or Linux. While for ease of understanding, SMEM 132 has been described as being configured to recognize request of virtual address ranges of specific smart memories 105 or aggregation of smart memories 105, in alternate embodiments, SMEM 132 may be configured to recognize request of virtual address ranges of specific portions of smart memories 105, thereby allow applications 114 to practice contiguous location-aware data store/load at specific groups of memory blocks 118 of a smart memory 105. Thus, the term memory unit as used herein may refer to a memory block or a group of memory blocks within a smart memory 105, or a smart memory 105. Applications 114, except for their practice of location aware data store/load leveraging on the smart memory data store/load technology of the disclosure to reduce/eliminate data fragmentation when using smart memory 105, may likewise be any one of a number of applications known in the art.

Figure 4:
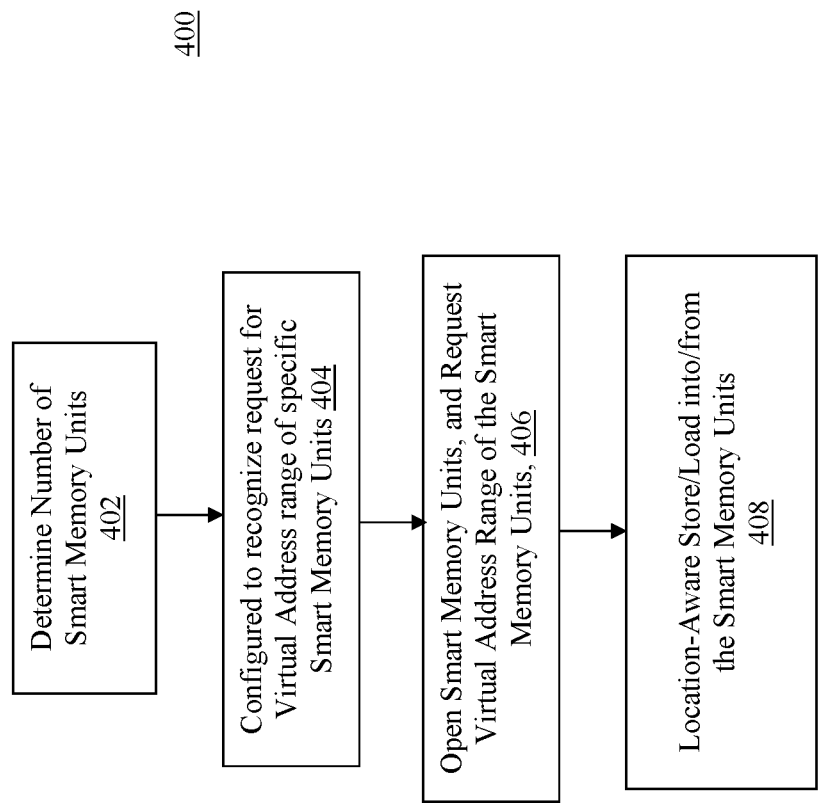
FIG. 4 illustrates an example location-aware smart memory data store/load process, according to various embodiments.

Referring now to FIG. 4, wherein an example smart memory data store/load process, according to various embodiments, is shown. As illustrated, process 400 for storing data into a smart memory may include operations performed at blocks 402-408. The operations at blocks 402-408 may be performed by earlier described OS 112, in particular, SMEM 132, and applications 114.

Process 400 may start at block 402. At block 402, the number of smart memories may be detected, and the configuration for supporting location-aware data store/load contiguously may be determined, e.g., by SMEM 132. The configuration may be determined in accordance with inputs from a system administrator or in accordance with a default specification. The configuration may be made available to the applications in any one of a number of known manners, e.g., through the APCI configuration tables. At block 404, on determination, a memory-mapped device access driver, e.g., SMEM 132, may be configured (or self-configured) to recognize requests from applications for virtual address ranges of specific (aggregation of) smart memories (or portions thereof, in some embodiments).

Next, at block 406, an application 114 may selectively open specific ones or aggregations of the smart memories (or portions thereof, in alternate embodiments), and specifically request the virtual address ranges of individual ones or aggregations of the smart memories (or individual portions, in alternate embodiments). In Linux embodiments, the application 114 may open a specific one or aggregation of the smart memory, and call the memory-mapped specifically request the virtual address range of the opened smart memory or aggregation (or portion) by using the Open & MMap calls. At block 408, the application 114 may perform location-aware data store/load to specific smart memory or aggregation (or portion) to reduce or eliminate the data fragmentation issue caused by hardware implemented physical memory interleaving.

Following is an example to illustrate usage of the smart memory data store/load technology of the disclosure to reduce or eliminate the data fragmentation issue caused by hardware implemented physical memory interleaving, when storing data into a smart memory. Consider an example student database having one or more tables with respective columns to store student names, dates-of-birth, heights, weights and parent incomes of the students. For current location-agnostic programming methodology, in a Linux environment, an application would issue open/dev/mem to open the smart memory, and then call mmap to obtain the memory mapping. Thereafter, the application may write to the mapped memory: [student1][name], [student1][date of birth], [student1][height], [student1][weight], [student1][parent's income], [student2][name], [student2][date of birth], [student2] [height], [student2] [weight], [student2] [parent's income], [student3][name] and etc. When the data are stored into the smart memory, the data interleaved by hardware thus fragmented across the multiple smart memories.

However, with the smart memory data store technology of the disclosure, the application may practice location-aware programming methodology. For an example Linux embodiment where the smart memory units are singularly recognized, the application, may issue open/dev/smem1 to specifically open smart memory 0, then call mmap to obtain the memory mapping, issue open/dev/smem2 to specifically open smart memory 1, then call mmap to obtain the memory mapping, for as many smart memories as required and available. The application may then store [student1] [name], [student2] [name], [student3] [name] and so on in the first mapped smart memory (corresponding to smem1), store [student1][date of birth], [student2][ date of birth], [student3][ date of birth] and so on in the second mapped smart memory (corresponding to smem2), and so on. Data may be interleaved into to multiple datasets. Through the earlier described page table, each dataset would be ensured to be stored in contiguous order in the smart memory. Effectively, the process defragments the fragmentation caused by the hardware implemented physical memory interleaving of the smart memory.

In this example, every singularly recognized smart memory stores a column of the database. When searching of the data is performed, say for a search to determine who are the students that have height between 4 feet to 4.5 feet, the third smart memory can perform the search. Different search requests can also be sent to different smart memories in parallel. Resultantly, smart memory operations can be benefited from hardware interleave configuration, at the same time, other operations in the same system continues to be benefited from hardware interleave configuration.

In real database environment, an application can have as many columns or all columns as required of a database to arrive in a smart memory in contiguous manner (as seen by the NDP/IMP of the smart memory) even though platform setting is interleave. Another smart memory may be used to accommodate another set of columns or another database as required in the contiguous manner, as seen by the accelerator logic.

In some embodiments, smart memory can work as normal memory if NDP is not required for certain operation. The basic concept is smart memory can work as normal memory when location-agnostic application issues open/dev/mem to open the smart memory, and then mmap it. Hardware implementation of interleave is preferred in this operation for maintaining the performance of normal memory applications. In other embodiments, different operation regions may be implemented for a smart memory, e.g., one for normal operation another for smart operation. In still other embodiments, individual smart memory and individual normal memory may be interleaved together. The disclosure enables co-existence of interleave and smart memory. Users do not lose the benefits of hardware interleave configuration when using smart memory.

Following is an example of different use regions of a smart memory. An example system may have 6 smart DIMMs with interleave enforced by hardware, each smart DIMM may have 64 GB of storage, providing a total of 384 GB of storage. The user may decide that the system just needs 64 GB for OS and application operation. The rest of memory, 320 GB may be used for an In-Memory Database (IMDB). So the user may set certain system configuration parameters to set aside 64 GB of the smart memory for the OS and applications. After start up, the OS and the applications would work within the boundary of the set aside 64 GB of storage. From a physical view, each smart DIMM contributes portion of memory (10.66 GB) for the OS and the application to run and use. The IMDB application knows about the 320 GB portion being free, so puts the database to resident in the 320 GB.

Today, the IMDB application would call the memory-mapped device access driver to get access to the 320 GB of storage. When data is stored into the 320 GB portion, the hardware interleaves the data into the 6 smart DIMMs. Without the present disclosed technology, a stream of contiguous data would be fragmented and distributed into the 6 smart DIMMs.

However, with the disclosure, an application may call the specific smart memory; in an example Linux environment, /dev/smem1, /dev/smem2 until /dev/smem6. Thereafter, IMDB application may store/load data to/from smem1 in contiguous manner, smem2 in contiguous manner, . . . , and smem6 in contiguous manner. The disclosure enables the IMDB application to interleave data at software level, meaning the IMDB application can generate many datasets, and store one or more datasets to smem1 or 2 until 6 accordingly. The complete dataset can be stored or processed or loaded to or by or from smem1 or 2 until 6. The data storing or processing or loading can also be done in parallel to or by or from smem1 and 2 until 6.

In other words, in general, a smart memory arrangement having n dual in-line memory modules (DIMM), each with a size of m GB, may each contribute k/n of m GB of memory locations for data storage that do not need NDP/IMP, such as, but not limited to, operating system, or memory holes for memory-mapped I/O device, and the remaining m-k/n GB memory locations of each of then DIMM may be set aside to meet high speed, low latency data storage needs of an application that need NDP/IMP, e.g., but not limited to, an In-Memory Database.

Figure 5:
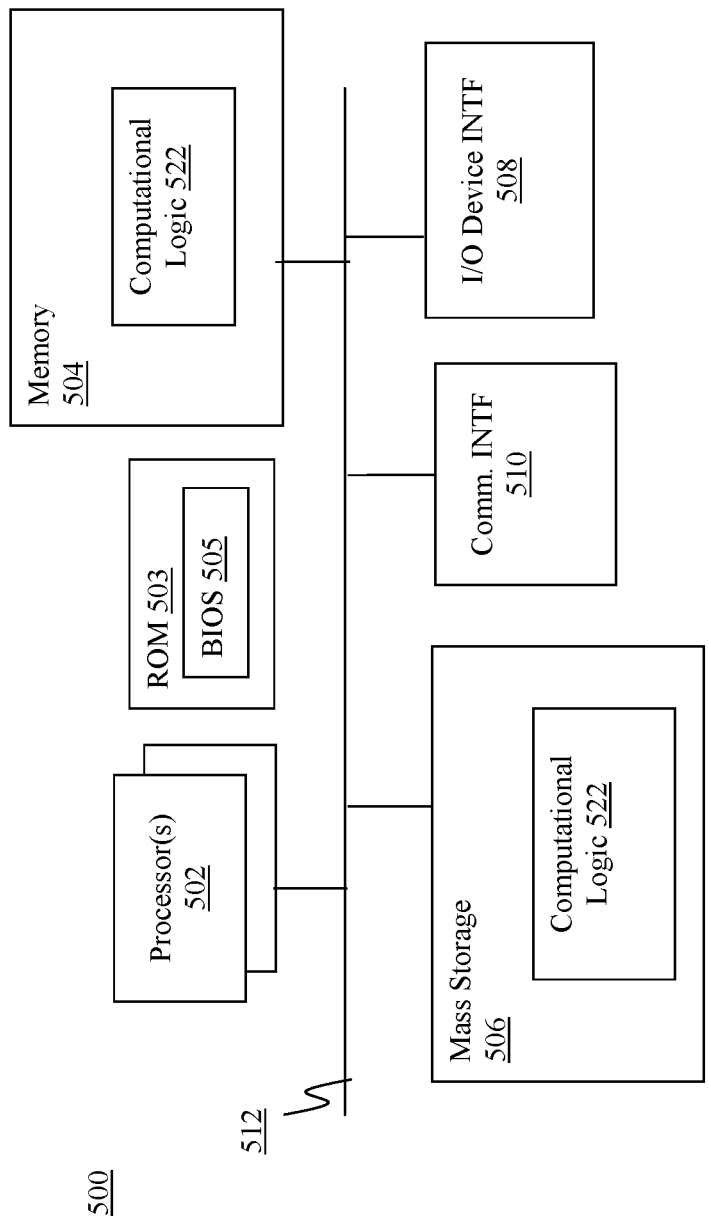
FIG. 5 illustrates an example computer system suitable for use to practice aspects of the disclosure, according to various embodiments.

FIG. 5 illustrates an example computer system that may be suitable for use to practice selected aspects of the disclosure. As shown, computer system 500 may include one or more processors or processor cores 502 with application execution enclave support, read-only memory (ROM) 503, and system memory 504. Additionally, computer system 500 may include mass storage devices 506. Example of mass storage devices 506 may include, but are not limited to, tape drives, hard drives, compact disc read-only memory (CD-ROM) and so forth. Further, computer system 500 may include input/output devices 508 (such as display, keyboard, cursor control and so forth) and communication interfaces 510 (such as network interface cards, modems and so forth). The elements may be coupled to each other via system bus 512, which may represent one or more buses. In the case of multiple buses, they may be bridged by one or more bus bridges (not shown).

Each of these elements may perform its conventional functions known in the art. In particular, ROM 503 may include basic input/output system services (BIOS) 505. System memory 504 and mass storage devices 506 may be employed to store a working copy and a permanent copy of the programming instructions implementing the operations associated with applications 114 and/or OS 112, including kernel 130 with drivers (in particular SMEM) 132, as earlier described, collectively referred to as computational logic 522. The various elements may be implemented by assembler instructions supported by processor(s) 502 or high-level languages, such as, for example, C, that can be compiled into such instructions.

The number, capability and/or capacity of these elements 510-512 may vary, depending on whether computer system 500 is used as a mobile device, a smartphone, a computer tablet, a laptop and so forth, or a stationary device, such as a desktop computer, a server, a game console, a set-top box, an infotainment console, and so forth. Otherwise, the constitutions of elements 510-512 are known, and accordingly will not be further described.

Figure 6:
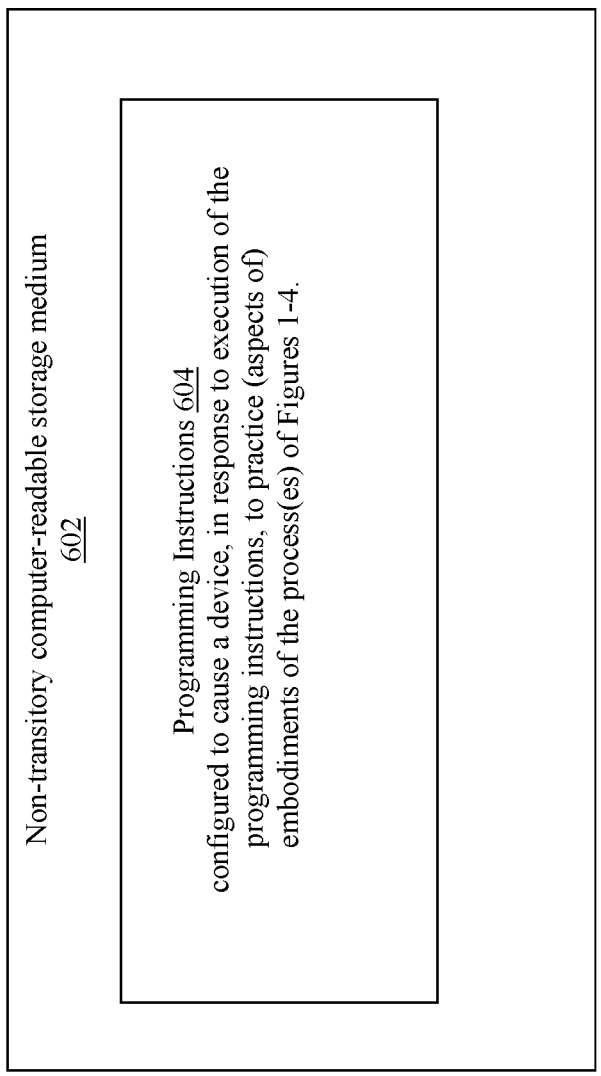
FIG. 6 illustrates a storage medium having instructions for practicing methods described with references to FIGS. 1-4, according to various embodiments.

As will be appreciated by one skilled in the art, the disclosure may be embodied as methods or computer program products. Accordingly, the disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the disclosure may take the form of a computer program product embodied in any tangible or non-transitory medium of expression having computer-usable program code embodied in the medium. FIG. 6 illustrates an example computer-readable non-transitory storage medium that may be suitable for use to store instructions that cause an apparatus, in response to execution of the instructions by the apparatus, to practice selected aspects of the disclosure. As shown, non-transitory computer-readable storage medium 602 may include a number of programming instructions 604. Programming instructions 604 may be configured to enable a device, e.g., computer system 500, in response to execution of the programming instructions, to implement (aspects of) OS 112, including kernel 130 with drivers (in particular SMEM) 132, and/or applications 114. In alternate embodiments, programming instructions 604 may be disposed on multiple computer-readable non-transitory storage media 602 instead. In still other embodiments, programming instructions 604 may be disposed on computer-readable transitory storage media 602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 5, for one embodiment, at least one of processors 502 may be packaged together with memory having aspects of OS 112, including kernel 130 with drivers (in particular SMEM) 132. For one embodiment, at least one of processors 502 may be packaged together with memory having aspects of OS 112, including kernel 130 with drivers (in particular SMEM) 132, to form a System in Package (SiP). For one embodiment, at least one of processors 502 may be integrated on the same die with memory having aspects of OS 112, e.g., including kernel 130 with drivers (in particular SMEM) 132. For one embodiment, at least one of processors 502 may be packaged together with memory having aspects of OS 112, including kernel 130 with drivers (in particular SMEM) 132, to form a System on Chip (SoC). For at least one embodiment, the SoC may be utilized in, e.g., but not limited to, a smartphone or computing tablet.

Thus various example embodiments of the disclosure have been described including, but are not limited to:

Example 1 may be an apparatus for computing, comprising: a processor; a plurality of memory units; a memory controller coupled with the processor and the plurality of memory units to control access of the plurality of memory units, controlling access of the plurality of memory units includes hardware physical memory interleaving support; one or more hardware data processing logic blocks coupled to the plurality of memory units to provide near data processing of data received by the plurality of memory units; and a driver operated by the processor to support applications operated by the processor to perform location-aware memory-mapped device accesses to selectively store data into or load data from selected ones or aggregated ones of the plurality of memory units contiguously.

Example 2 may be example 1, wherein the driver may obtain for the application contiguous virtual addresses mapped for a memory unit or an aggregation of selected ones of the plurality of memory units of the plurality of memory units.

Example 3 may be example 2; wherein to perform the location-aware memory-mapped device accesses by an application, the application may call the driver to open one or an aggregation of the plurality of memory units, in response to the call by the application, the driver specifically obtains contiguous virtual addresses mapped for the opened one or aggregation of the memory units, and stores a selected group of data into the mapped memory unit or the mapped aggregation of memory units.

Example 4 may be example 1, wherein the driver may further obtain a physical memory map of a memory unit of the plurality of memory units.

Example 5 may be example 4, wherein the driver may obtain the physical memory map of the memory unit from an advanced configuration power interface (ACPI) table.

Example 6 may be example 4, wherein the driver may further handle physical address to virtual address translation, select physical frame numbers of the plurality of memory units to map to virtual page numbers, and populate virtual page number to physical frame number mappings into a page table associated with the plurality of memory units.

Example 7 may be example 1, wherein a size of an interleaved line of the memory units may equal to or may be in multiple of a size of a virtual memory page.

Example 8 may be example 1, wherein the plurality of memory units may be memory modules within a dual in-line memory modules (DIMM), DIMMs, non-volatile DIMMs, or synchronous dynamic random access memory (SDRAM).

Example 9 may be example 1 further comprising an operating system having a kernel that includes the driver.

Example 10 may be example 1, wherein the memory units may comprise n dual in-line memory modules (DIMM), each with a size of m GB, and each contributes k/n of m GB of memory locations for storage of data that do not use near data processing (NDP) or in memory processing (IMP), and the remaining m-k/n GB memory locations of each of the n DIMM are used for storage of data that use NDP or IMP.

Example 11 may be example 1, wherein the memory controller is part of the processor.

Example 12 may be any one of examples 1-11, wherein the plurality of memory units and the one or more hardware data processing logic blocks may be integral parts of one or more smart memory units.

Example 13 may be a method for computing, comprising: obtaining, by a driver operated by a processor of a computing device, one or more physical memory maps of a plurality of memory units of a smart memory arrangement; populating, by the driver, virtual page number to physical frame number mappings into a page table associated with the memory units; and in response to a request of an application of the computing device specific for one or an aggregation of the memory units, providing, by the driver, a virtual address range of the memory unit or the aggregation of the memory units, for the application to practice location-aware memory-mapped device accesses to selectively store data into the memory unit or the aggregation of memory units contiguously; wherein the memory units of the smart memory arrangement include or are complemented with hardware physical memory interleaving and near data processing logic.

Example 14 may be example 13; further comprising the application calling the driver to open one or an aggregation of the plurality of memory units, in response to the call of the application, the driver specifically obtaining contiguous virtual addresses mapped for the opened memory unit or the aggregation of memory units, and storing a selected group of data into the mapped memory unit or the aggregation.

Example 15 may be example 13, wherein obtaining may comprise the driver obtaining the physical memory maps of the memory units from an advanced configuration power interface (ACPI) table.

Example 16 may be any one of examples 13-15, further comprising the driver selecting physical frame numbers of the plurality of memory units to map to virtual page numbers, and handling physical address to virtual address translation.

Example 17 may be one or more transitory or non-transitory computer-readable media (CRM) comprising instructions that cause a computing device, in response to execution of the instructions by a processor of the computing device, to provide a driver, to: obtain one or more physical memory maps of a plurality of memory units of a smart memory arrangement, populate virtual page number to physical frame number mappings into a page table associated with the memory units, and in response to a request of an application of the computing device specific for one or an aggregation of the memory units, provide a virtual address range of the memory unit or the aggregation, for the application to practice location-aware memory-mapped device accesses to selectively store data into the memory unit or the aggregation contiguously; and wherein the plurality of memory units of the smart memory arrangement include or are complemented with near data processing logic and hardware physical memory interleaving.

Example 18 may be example 17, wherein to obtain may comprise to obtain the physical memory maps of the memory units from an advanced configuration power interface (ACPI) table.

Example 19 may be example 17 or 18, wherein the driver may further select physical frame numbers of the plurality of memory units to map to virtual page numbers, and handle physical address to virtual address translation.

Example 20 may be an apparatus for computing, comprising: a processor; a plurality of memory units; a memory controller coupled with the processor and the plurality of memory units to control access of the plurality of memory units, controlling access of the plurality of memory units includes hardware physical memory interleaving support; one or more hardware data processing logic blocks coupled to the plurality of memory units to provide near data processing of data received by the plurality of memory units; and means for supporting applications operated by the one or more processors to perform location-aware memory-mapped device accesses to selectively store data into or load data from selected ones or aggregated ones of the plurality of memory units contiguously.

Example 21 may be example 20, wherein the means for supporting may comprise means for obtaining for the application contiguous virtual addresses mapped for a memory unit or an aggregation of selected ones of the memory units.

Example 22 may be example 21; wherein to perform the location-aware memory-mapped device accesses, an application may call the means for supporting to open one or an aggregation of the plurality of memory units, call the means for supporting specifically to obtain contiguous virtual addresses mapped for the opened memory unit or an aggregation of memory units, and store a selected group of data into the mapped memory unit or the aggregation of memory units.

Example 23 may be example 20, wherein the means for supporting may comprise means for obtaining a physical memory map of a memory unit of the plurality of memory units.

Example 24 may be example 23, wherein the means for obtaining may comprise means for retrieving the physical memory map of the memory unit from an advanced configuration power interface (ACPI) table.

Example 25 may be example 23, wherein the means for supporting may comprise means for handling physical address to virtual address translation, means for selecting physical frame numbers of the plurality of memory units to map to virtual page numbers, and means for populating virtual page number to physical frame number mappings into a page table associated with the plurality of memory units.

Example 26 may be example 20, wherein a size of an interleaved line of the memory units is equal to or in multiple of a size of a virtual memory page.

Example 27 may be example 20, wherein the plurality of memory units are memory modules within a dual in-line memory modules (DIMM), DIMMs, non-volatile DIMMs, or synchronous dynamic random access memory (SDRAM).

Example 28 may be example 20 further comprising an operating system having a kernel that includes the means for supporting.

Example 29 may be example 20, wherein the memory units comprise n dual in-line memory modules (DIMM), each with a size of m GB, and each contributes k/n of m GB of memory locations for storage of data that do not use near data processing (NDP) or in memory processing (IMP), and the remaining m-k/n GB memory locations of each of the n DIMM are used for storage of data that use NDP or IMP.

Example 30 may be example 20, wherein the memory controller is part of the processor.

Example 31 may be any one of examples 20-30, wherein the plurality of memory units and the one or more hardware data processing logic blocks may be integral parts of one or more smart memory units.

It will be apparent to those skilled in the art that various modifications and variations can be made in the disclosed embodiments of the disclosed device and associated methods without departing from the spirit or scope of the disclosure. Thus, it is intended that the disclosure covers the modifications and variations of the embodiments disclosed above provided that the modifications and variations come within the scope of any claims and their equivalents.

What is claimed is:

1. An apparatus for computing, comprising:
a processor;
a plurality of memory units;
a memory controller coupled with the processor and the plurality of memory units to control access of the plurality of memory units, wherein controlling access of the plurality of memory units includes hardware physical memory interleaving support that splits storage of data of a virtual memory page of an application into multiple ones of the memory units, including into multiple discontiguous ones of the memory units;
one or more hardware data processing logic blocks coupled to the plurality of memory units to provide at memory data processing of data received by the plurality of memory units; and
a driver operated by the processor to support an application operated by the processor, wherein the driver is arranged to perform location-aware memory-mapped device accesses to selectively store data into contiguous ones or aggregations of the memory units to effectively negate the hardware physical memory interleaving support, or load data from selected contiguous ones or aggregations of the plurality of memory units having previously effectively negated the hardware physical memory interleaving support, to allow the one or more hardware data processing logic blocks to perform the at memory data processing on the data being loaded back from the memory units, without having to first reassemble the data being loaded back from the memory units due to the data being loaded back having been split stored into discontiguous memory units by the hardware physical memory interleaving support.

2. The apparatus of claim 1, wherein the driver is to obtain for the application contiguous virtual addresses mapped for a memory unit of the plurality of memory units.

3. The apparatus of claim 2, wherein to perform the location-aware memory-mapped device accesses by the application, the application is to call the driver to open one or an aggregation of selected ones of the plurality of memory units, responsive to the call of the application, the driver specifically obtains contiguous virtual addresses mapped for the opened memory unit or the aggregation of memory units, and contiguously stores a selected group of data into the mapped memory unit or the aggregation of memory units.

4. The apparatus of claim 1, wherein the driver is to further obtain a physical memory map of a memory unit or an aggregation of memory units of the plurality of memory units.

5. The apparatus of claim 4, wherein the driver is to obtain the physical memory map of the memory unit from an advanced configuration power interface (ACPI) table.

6. The apparatus of claim 4, wherein the driver is to further handle physical address to virtual address translation, select physical frame numbers of the plurality of memory units to map to virtual page numbers, and populate virtual page number to physical frame number mappings into a page table associated with the plurality of memory units.

7. The apparatus of claim 1, wherein a size of an interleaved line of the memory units is equal to or in multiple of a size of a virtual memory page.

8. The apparatus of claim 1, wherein the plurality of memory units are memory modules within a dual in-line memory modules (DIMM), DIMMs, non-volatile DIMMs, or synchronous dynamic random access memory (SDRAM).

9. The apparatus of claim 1, further comprising an operating system having a kernel that includes the driver.

10. The apparatus of claim 1, wherein the plurality of memory units comprise n dual in-line memory modules (DIMM), each with a size of m GB, and each contributes k/n of m GB of memory locations for storage of data that do not use near data processing (NDP) or in memory processing (IMP), and the remaining m−k/n GB memory locations of each of the n DIMM are used for storage of data that use NDP or IMP.

11. The apparatus of claim 1, wherein the memory controller is part of the processor.

12. The apparatus of claim 1, wherein the plurality of memory units and the one or more hardware data processing logic blocks are integral parts of one or more smart memory units.

13. A method for computing, comprising:
obtaining, by a driver operated by a processor of a computing device, one or more physical memory maps of a plurality of memory units of a smart memory arrangement, the smart memory arrangement including or being complemented with hardware physical memory interleaving that splits storage of data of a virtual memory page of an application into multiple ones of the memory units, including into multiple discontiguous ones of the memory units;
populating, by the driver, virtual page number to physical frame number mappings into a page table associated with the memory units; and
in response to a request of an application of the computing device specific for one or an aggregation of selected ones of the memory units, providing, by the driver, a virtual address range of the memory unit or the aggregation of memory units, for the application to practice location-aware memory-mapped device accesses to selectively store data into the memory unit or the aggregation of memory units contiguously, effectively negating the hardware physical memory interleaving support;
wherein the smart memory arrangement further includes data processing logic to provide at memory data processing of data loaded back from the plurality of memory units, and wherein the location-aware memory-mapped device accesses cause the at memory data processing logic to selectively perform at memory processing of data being loaded back from the memory units, without having to first reassemble the data being loaded back from the memory units due to the data being loaded back having been split stored into discontiguous memory units by the hardware physical memory interleaving support.

14. The method of claim 13, further comprising the application calling the driver to open one or an aggregation of selected ones of the plurality of memory units, in response to the call of the application, the driver specifically obtaining contiguous virtual addresses mapped for the opened memory unit or the aggregation of memory units, and contiguously storing a selected group of data into the mapped memory unit or the aggregation of memory units.

15. The method of claim 13, wherein obtaining comprises the driver obtaining the physical memory maps of the memory units from an advanced configuration power interface (ACPI) table.

16. The method of claim 13, further comprising the driver selecting physical frame numbers of the plurality of memory units to map to virtual page numbers, and handling physical address to virtual address translation.

17. One or more non-transitory computer-readable media (CRM) comprising instructions that cause a computing device, in response to execution of the instructions by a processor of the computing device, to provide a driver, to:
obtain one or more physical memory maps of a plurality of memory units of a smart memory arrangement, populate virtual page number to physical frame number mappings into a page table associated with the memory units, and in response to a request of an application of the computing device specific for one or an aggregation of selected ones of the memory units, provide a virtual address range of the memory unit or the aggregation of memory units, for the application to practice location-aware memory-mapped device accesses to selectively store data into the memory unit or the aggregation of memory units contiguously; and
wherein the smart memory arrangement includes hardware physical memory interleaving support that splits storage of data of a virtual memory page of an application into multiple ones of the memory units, including into multiple discontiguous ones of the memory units;
wherein the smart memory arrangement further includes or is complemented with data processing logic to provide at memory data processing of data being loaded back from the plurality of memory units; and
wherein the location-aware memory-mapped device accesses effectively negate the hardware physical memory interleaving support, and enable the data processing logic to selectively perform at memory process of data being loaded back from the memory units, without having to first reassemble the data being loaded back from the memory units, due to the data being loaded back having been split stored into discontiguous memory units by the hardware physical memory interleaving support.

18. The CRM of claim 17, wherein to obtain comprises to obtain the physical memory maps of the memory units from an advanced configuration power interface (ACPI) table.

19. The CRM of claim 17, wherein the driver is to further select physical frame numbers of the plurality of memory units to map to virtual page numbers, and handle physical address to virtual address translation.

20. The CRM of claim 17, wherein a size of an interleaved line of the memory units is equal to or in multiple of a size of a virtual memory page.

21. The CRM of claim 17, wherein the plurality of memory units are memory modules within a dual in-line memory modules (DIMM), DIMMs, non-volatile DIMMs, or synchronous dynamic random access memory (SDRAM).

22. The CRM of claim 17, wherein the driver is part of a kernel of an operating system.

23. The CRM of claim 17, wherein the memory units comprise n dual in-line memory modules (DIMM), each with a size of m GB, and each contributes k/n of m GB of memory locations for storage of data that do not use near data processing (NDP) or in memory processing (IMP), and the remaining m−k/n GB memory locations of each of then DIMM are used for storage of data that use NDP or IMP.

* * * * *